United States Patent Office 2,871,503
Patented Feb. 3, 1959

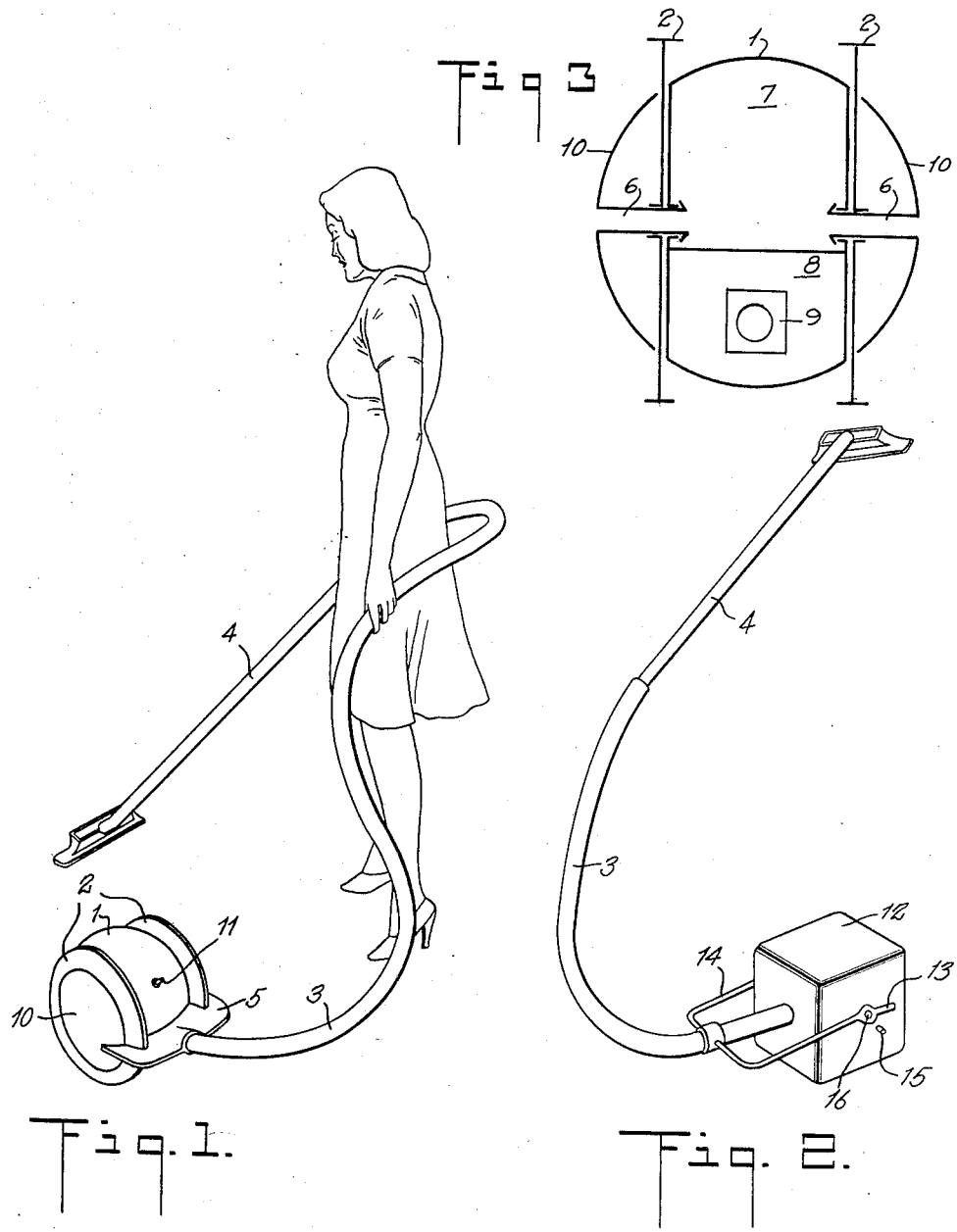

2,871,503

VACUUM CLEANER ON-AND-OFF SWITCHING DEVICES

Edgar P. Senné, Suffolk County, N. Y.

Original application December 27, 1948, Serial No. 67,498, now abandoned. Divided and this application July 2, 1953, Serial No. 365,680

2 Claims. (Cl. 15—327)

This application is a division of my application Ser. No. 67,498, filed December 27, 1948, now abandoned.

It is the primary purpose of this invention to provide a new and improved means for switching air-filter machines, such as vacuum cleaners, on and off at the will of the operator. While not limited thereto, it nevertheless contemplates particularly the provision of switching arrangements which facilitate the task of performing the frequent and intermittent switchings required during the operation of domestic-type vacuum cleaners; and, in that respect, it is particularly useful with and adaptable to domestic-type vacuum cleaners of the type controlled and operated entirely by the exertion of manual forces on a portable cleaning hose attached to the body of the cleaner.

In a common type of vacuum cleaner, the essential mechanisms of the filter and air-propulsion means are built within a relatively light chassis which is usually so constructed that it may be freely and easily propelled, or dragged, by the operator in random directions over a floor by means of manual forces exerted on an elongated suction hose having a proximal end affixed to the cleaner and a wand-like exploring distal end permitting the operator to pick up dirt at some distance from the cleaner. For example, I have described and claimed illustrative machines of this general type in my U. S. Letters Patent No. 2,632,524, issued March 24, 1953.

Most cleaners of this type have heretofore been so constructed that the on-and-off switching of the motor must be effected by direct operation of a switch located on the chassis. The arrangement is such that each time the operator wishes to switch the machine on or off, she or he must walk to the chassis and perform a manual or pedal operation upon the switch. At times, the performance of this operation can involve inconvenient walking or other body motions for the operator or, at least, distract the operator's attention from more important jobs. Considering, too, the frequency with which this operation must be performed in practice, for example, in the daily operation of an ordinary, domestic-type vacuum cleaner, it will be appreciated that any construction which simplifies the bodily motion involved will constitute an improvement in the art.

I have visualized that the switching arrangements heretofore in use could be substantially improved upon to the convenience of the operator by providing switching devices which may be operated by a light, almost exertionless, manipulation of the suction hose which moves its proximal end away from some normal operating position in which it might normally be held by the machine itself or by the operator as he or she traverses the floor with the distal end. Such manipulation might, for example, amount to a simple twisting or lifting of the hose or other slight movement requiring little effort and which might be performed without distraction of the operator's attention from the primary task of moving the hose over the surface to be cleaned. I contemplate, as a primary desideratum, that the manual force and resultant motion required to start or stop the machine need only be employed momentarily, that is, the force need not be exerted continuously nor the resultant displacement maintained in order to keep the machine running. Thus, once started, the machine continues to run without the application of any control manual force while the hose returns to its predetermined, normal, operating position. Conversely, once stopped it remains so, while the hose returns to normal operating position. Moreover, the same manipulation could be used either for starting or stopping the machine; that is to say, successive identical manipulations would start it and stop it alternately. To that end, the switch would preferably be of the type which is open or closed by successive actuations thereof, i. e., one actuation would open it and the next would close it and so on, cyclically.

By these means, the operation of the machine would be simplified to the extent that the operator need not remove his or her hands from the hose while cleaning, nor need he or she be subjected to the inconvenient necessity of walking back to the machine proper in order to start it or stop it. In point of fact, the operator may even operate the switch by hose manipulation while standing at some distance from the machine.

The features of the invention believed novel and upon which patent protection is sought are set forth in the appended claims. The invention itself together with further objects and the advantages thereof may best be understood by reference to the following specification taken in connection with the accompanying drawings in which:

Figs. 1 and 2 represent, in perspective, illustrative vacuum cleaners in which the invention might be used.

Fig. 3 is a schematic illustration of the essential elements of the machine of Fig. 1 to show the way in which the various elements may be mounted.

Throughout the figures, like numerals have been used to designate like parts.

Referring now to Figs. 1 and 3, it will be noted that the machine there shown comprises, generally, a freely rotatable chassis 1 so mounted on a pair of wheels 2—2 that it may be freely and easily pushed, pulled, or rotated about vertical axes in any random direction over a floor by means of manual forces exerted by the operator on an elongated suction hose 3 having its proximal end affixed to the machine at the yoke 5 and the wand-like exploring end 4 which permits the operator to pick up dirt at some distance from the machine. The general construction, particularly the yoke mechanism, may be essentially that shown and claimed in my U. S. Patent 2,550,384, issued April 4, 1951. Thus, the path of flow of air into the machine may follow the hose 3 into the rotatable yoke 5 provided with channels which direct the air axially into the machine, for example, suitable channels in the yoke may be caused to interconnect with such channels as those designated 6 in Fig. 3. As in my latter patent, the flow path may proceed from channels 6 into a suitable air-filter compartment 7 and air-propulsion compartment 8 containing an air-propulsion electrical motor fan unit 9. The bulbous portions 10 external to the wheels 2 may be mounted to rotate freely with the yoke 5. The chassis 1 may be freely mounted for rotation and suitably weighted as by means of the electrical motor fan unit 9 in the bottom portion thereof so that it will normally assume an equilibrium upright position in which it is normally relatively stationary with respect to other parts, such as the yoke.

On the outer surface of the chassis 1, any suitable electrical switch 11 for actuating or controlling the motor fan unit 9 may be provided and so positioned that it will be actuated alternately "on" and "off" by successive contacts with the yoke 5 as the latter is raised by manipulation of the hose by the operator. Since the electric circuits interconnecting unit 9 and switch 11, as well as the electrical, power-supply connections, are quite obvious to those skilled in the art, such are for convenience of illustration omitted in the drawings.

It will be apparent from the foregoing that on-and-off switching of the motor may be very simply accomplished by small manipulations of the hose by the operator to move the yoke away from its normally horizontal position maintained during operation. It will be merely necessary for the operator to raise the hose by a predetermined amount until the yoke 5 contacts the relatively stationary switch 11 and thereby operates the switch. Such manipulations may be conducted very conveniently without even distracting the operator's vision from the operation of the cleaning wand, and, in fact, in most cases it may be accomplished while the operator is standing at a relatively great distance from the machine, that is, with his or her hand at approximately the outer end of the hose 3. Moreover, upon operation of the switch, the hose and yoke will return to normally horizontal operating position, leaving the switch in the condition (open or closed) effected by the immediately preceding manipulation.

It will be understood that the chassis 1 rotates freely about the axle between the wheels and that it is otherwise constructed as disclosed in my aforesaid U. S. Patent No. 2,632,524. That is to say, the chassis is divided into two semi-cylindrical sections by a partition, the filter bag being in one section and a motor fan unit being in the other. The axle of the wheels is concentric with the cylindrical configuration of the chassis. Therefore, the weight of the motor and fan unit, which is considerably more than the filter bag, will tend to rotate the chassis to a normal equilibrium position in which the filter bag is on top of the axle and the motor fan unit below it.

Fig. 2 illustrates one use of the invention in a type not provided with wheels but constructed with some convenient box-like case 12 which may be dragged over a floor by means of hose 3. On-and-off switching may be accomplished by manipulation of hose 3 to move rearward extension 13 of yoke 14 into contact with switch 15. The yoke is journalled for rotation about pins 16.

In each of the forms of device shown there are a pair of journals or journal means which are fixed with respect to the chassis 1 and are co-axial with each other. In Figs. 1 and 3 wheels 2, 2 rotate upon this common axis. The yoke 5 (in Fig. 1), or 14 (in Fig. 2), is mounted in such manner that it also rotates upon this common axis. The yoke includes a socket to receive one end of hose 3, and the axis of this socket is substantially normal to the common axis of the journal means. Hence manual force transmitted through the hose to the socket and journal in a direction generally parallel to the axis of the socket, causes the case to be propelled across a level floor by forces transmitted to the common axis of the journal means in a direction at right angles thereto. In addition, when electric switch 11 or 15 is mounted upon chassis 1, or case 15, manual force transmitted through the hose to the socket and journal in a direction generally at right angles to the axis of the socket, causes the yoke to rotate about the common axis and thus to engage and actuate switch 11 or 15.

It will also be understood that the switches throughout the figures will be the type designed for alternate opening and closing upon successive manipulations of the hose. It will, therefore, be apparent that as the operator successively manipulates the hose to move its proximal end by a predetermined angular amount, the motor will be conveniently switched on or off.

While I have shown and described several modifications of my invention, it will be understood by those skilled in the art that numerous other modifications thereof are quite possible. All such, as fall within the true spirit and scope of my invention, I aim to cover with the appended claims.

I claim:

1. A vacuum cleaner comprising, in combination, a case containing a filter chamber and air propulsion means including an electric motor, an exploring hose, journal means fixed with respect to the case, hose-supporting means mounted to rotate coaxially with said journal means including a socket whose axis is substantially normal to the axis of said journal means for receiving one end of said hose, whereby the case may be propelled along a level floor surface by manual force transmitted through the hose to said socket and journal means and acting in a direction generally parallel to the axis of the socket, and an electric switch controlling said motor mounted in fixed relation to the case and adapted to be actuated by engagement therewith of said hose-supporting means when the same is rotated about the said journal, whereby the switch may be actuated by manual force transmitted through the hose to said socket and journal and acting in a direction generally at right angles to the axis of the socket.

2. A vacuum cleaner comprising, in combination, a pair of wheels, a chassis supported for swinging movement between and co-axially with said wheels and containing a filter chamber and air propulsion means including an electric motor, an exploring hose, a pair of journal means co-axial with said wheels, a hollow yoke mounted to rotate co-axially with said journal means and including a socket whose axis is substantially normal to the axis of the journal means for receiving one end of said hose, whereby the chassis may be propelled along a level floor surface by manual force transmitted through the hose to said socket and yoke in a direction generally parallel to the axis of the socket, and an electric switch controlling said motor mounted upon the chassis and adapted to be actuated by engagement therewith of said yoke when the same is rotated about the journals, whereby the switch may be actuated by manual force transmitted through the hose to said socket and yoke and acting in a direction generally at right angles to the axis of the socket.

References Cited in the file of this patent

UNITED STATES PATENTS

| | | |
|---|---|---|
| Re. 18,632 | Stedwell | Oct. 18, 1932 |
| 1,447,814 | Paulus | Mar. 6, 1923 |
| 1,573,771 | McClatchie | Feb. 16, 1926 |
| 1,582,664 | Bennington | Apr. 27, 1926 |
| 1,721,459 | McClatchie | July 16, 1929 |
| 1,856,133 | McClatchie | May 3, 1932 |
| 2,091,644 | Marvel | Aug. 31, 1937 |
| 2,583,949 | Kendrick | Jan. 29, 1952 |
| 2,616,114 | Kroenlein | Nov. 4, 1952 |